Feb. 28, 1933. J. J. HOPFIELD 1,899,804
LINE IMAGE PRODUCER
Filed July 20, 1931

Inventor
John J. Hopfield
By
Attorney

Patented Feb. 28, 1933

1,899,804

UNITED STATES PATENT OFFICE

JOHN J. HOPFIELD, OF WEST LAFAYETTE, INDIANA, ASSIGNOR TO PURDUE RESEARCH FOUNDATION, OF LA FAYETTE, INDIANA, A CORPORATION OF INDIANA

LINE IMAGE PRODUCER

Application filed July 20, 1931. Serial No. 552,058.

This invention is an improvement in devices for making very fine readings of deflections of an instrument, such as a galvanometer or the like, by means of a ray of light projected onto a mirror, attached to the galvanometer or instrument or object whose deflection is to be determined, and reflected by such mirror onto a scale placed at a greater or less distance from the mirror; so that slight deflections, which would be impossible to detect by direct reading of a scale attached to the galvanometer or object, are so amplified that they can be immediately detected and their extent determined.

Ordinarily the so-called "line image" displayed on the scale is the shadow of a fine thread or wire (commonly formed of filament such as employed in incandescent lights or of oqaque fibre, or metal) placed between the source of light and the lens or mirror; the shadow produced thereby being reflected onto the scale, and such shadow serving as an indicator on the scale to determine the deflection. Where the distances are very short such shadow line image is fairly sharp but if the scale is at some appreciable distance from the mirror, as is necessary in making very fine readings, the shadow line image becomes larger and wider and more obscure, so that it is practically impossible to accurately visually determine the exact center of such shadow line image, or the exact position of such center on the scale, and such obscurity and indefiniteness frequently results in errors in calculation due to the indefiniteness of such shadow line image.

I have discovered that a very bright sharp and clearly defined line image can be produced by employing, in place of the thread filament or wire such as heretofore employed, a very thin translucent or preferably transparent thread, or as I shall term it herein a rod, preferably made of glass or crystal or other suitable transparent material. This rod produces a bright line image so clearly defined and so narrow that it can be instantly easily and accurately located on the scale at all times, even in daylight. This transparent rod instead of producing a shadow image, such as is done by the devices heretofore employed, produces a clear sharp thin line of light at the exact center of the image, which image will be clearly and definitely defined on the scale whether the scale be near to or far removed from the mirror, so that absolutely accurate readings can be made.

To facilitate an understanding of the invention I will explain same as employed in connection with a galvanometer to determine the extent of very minute deflections thereof, and will summarize in the claims the essential features of the invention for which protection is desired.

Figure 1:
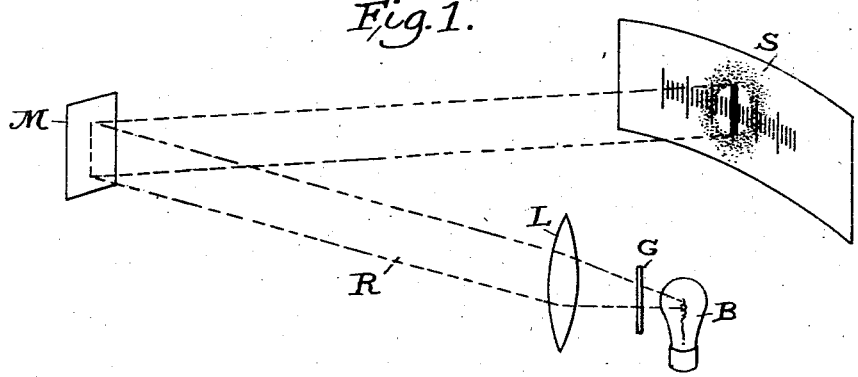
Fig. 1 is a perspective diagrammatic view of an apparatus equipped with my invention for determining deflections of a galvanometer.

In Fig. 1 of the drawing B represents a source of light, such as an electric bulb; L an acromatic lens; M the mirror of a galvanometer (not shown); S an enlarged scale upon which the light image is reflected.

A ray of light indicated at R issuing from the source B is transmitted through the lens L to the mirror M and reflected thereby onto scale S. The lens might be omitted if the mirror M was concave.

Between the light B and the lens L, I place a transparent rod G which is very thin and of small diameter. A rod made out of soft transparent glass such as soda glass gives excellent results. Pyrex glass does not form as smooth a rod as soft glass. The diameter of the portion of the rod through which the light is transmitted in an actual apparatus built by me was 0.015 cm. Rods of larger diameter can be used, but fine rods will produce narrower or sharper bright line images on the scale. The length of the rod is such as will suit the apparatus with which it is used, but the length is not material provided the portion of the rod through which the ray is transmitted is of proper size. In practice only a small part of the middle section of the rod G, that is the part through which the light ray is passed, needs to be made so fine; the other portions of the rod (through which the light ray is not passed) may be made heavier to facilitate handling the rod and securing same in position.

Figure 4:
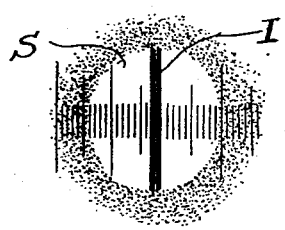
Fig. 4 is an enlarged detail view showing the bright line image produced by my invention.

Fig. 4 is copied from a photograph showing the line image projected on a ground line glass. The bright line I in the middle of the field is the image of the focal line: The dark lines on either side of such bright line are the shadows of the sides of the rod.

The bright line image produced by the use of the transparent rod as described is narrow and can be adapted to precision work similar to the telescope and scale. On account of the large patch of light surrounding the line image, the image can easily be located and its position read in full daylight, and enables the scale to be read in a dark room without any auxiliary light. If only the central fine line I is desired the rest of the light could be blocked out by a suitable screen placed near the fiber.

The distances between the various parts of the apparatus of course would vary according to the particular apparatus or material employed. In one instance with the type of apparatus illustrated in Figure 1 of the drawing, the light B and rod G were separated 2 cm; the lens L, with a focal length of 11.9 cm. was placed about 12 cm. in front of the rod G; the distance between lens L and mirror M was about 50 meters, and between mirror M and scale S about 150 meters. These relationships vary as indicated by the formula $1/f = 1/u + 1/r$ where $f$ is the focal length of the lens; $u$ the distance between the object (glass rod) and lens; and $r$ the distance between the lens and image (screen). In such set-up the magnification was 38 fold, but the white line image I was only about .5 mm. wide.

The arrangement shown produced such a very narrow bright line I on the scale S that readings could be taken therefrom with about the same precision as is obtained by using a telescope and scale.

Figure 2:
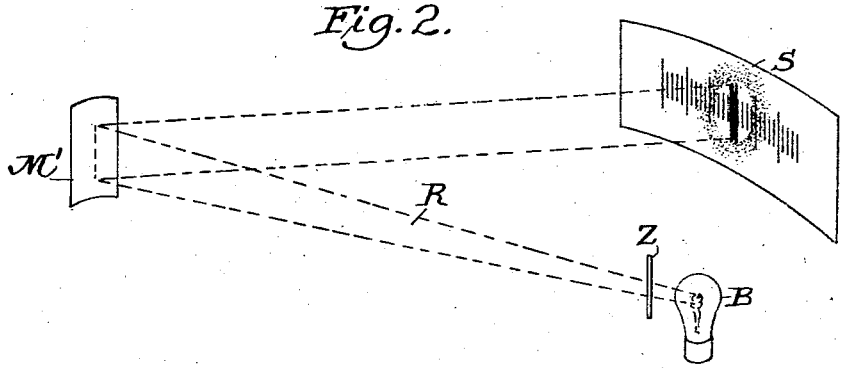
Fig. 2 is a similar diagrammatic view of another apparatus utilizing my invention.
Figure 3:
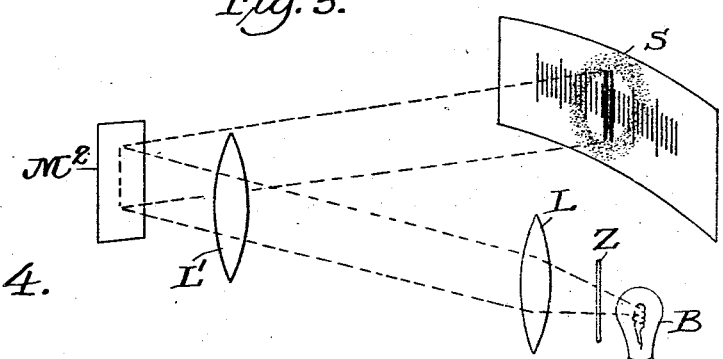
Fig. 3 is a similar view of another apparatus.

In Fig. 2 the lens is omitted and the ray of light passes direct from the lamp B through rod Z to mirror M', which is concave, and is reflected thereby onto the scale S. In Fig. 3 the ray of light passes from the lamp B through the rod Z to a lens L which transmits it to a second lens L' through which it passes to a mirror M² which reflects it onto the scale S. Other variations in construction might be made. The essential novel feature of the invention is a translucent or transparent rod adjacent the source of light and through which the ray is transmitted such rod producing the bright line image as above explained. This rod can be used in various systems or apparatus which include a light source, the rod, a galvanometer or its equivalent, and the scale.

The rod can also be mounted in the ordinary manner, namely, lamp, fiber, collimating lens, objective lens, galvanometer mirror, and objective lens again. In such an arrangement, the rod might be coarser and should be close to the collimating lens. The rod may be conveniently mounted in the housing of the light source. In some instances the rod might be enclosed in the lamp bulb.

The galvanometer mirror is usually housed in a metal casing having a transparent covering through which the ray of light passes before falling onto the mirror: If desired this transparent face might be replaced by a lens; but if the galvanometer mirror is made concave the lens could be dispensed with.

I claim:—

1. Apparatus for determining fine deflections of an object capable of deflection; comprising a source of light, a mirror adapted to be deflected by the object, a scale, and a cylindric member of small diameter and permeable by light interposed between the source of light and the mirror and producing a light line image reflected by the mirror onto the scale.

2. Apparatus for determining fine deflections of an object subject to deflection; comprising a source of light, a mirror mounted on the object, a scale, and a cylindric transparent member interposed between the source of light and the mirror adapted to produce a sharply defined line of light on the mirror, said line of light being reflected by the mirror onto the scale.

3. Apparatus for determining fine deflections of an object capable of deflection; comprising a source of light, a lens, a mirror connected with the object and deflected thereby, a scale, and a cylindric transparent rod interposed between the source of light and the lens, the ray of light transmitted through said rod to and through the lens producing a bright sharply defined line on the mirror reflected thereby on the scale.

4. Apparatus for determining fine deflections of a galvanometer, comprising a source of light, a mirror mounted on the movable member of the galvanometer, and a fine transparent rod interposed between the source of light and the mirror, the ray of light transmitted through said rod producing a bright sharply defined light line on the mirror and reflected thereby onto the scale.

JOHN J. HOPFIELD.